United States Patent
Bala et al.

(10) Patent No.: US 7,308,436 B2
(45) Date of Patent: Dec. 11, 2007

(54) DISTRIBUTED DATA MINING AND COMPRESSION METHOD AND SYSTEM

(75) Inventors: Jerzy Bala, Potomac Falls, VA (US); Ali Hadjarian, Burke, VA (US)

(73) Assignee: InferX Corporation, McLean, VA (US)

( * ) Notice: Subject to any disclaimer, the term of this patent is extended or adjusted under 35 U.S.C. 154(b) by 281 days.

(21) Appl. No.: 10/616,718

(22) Filed: Jul. 10, 2003

(65) Prior Publication Data

US 2004/0215598 A1 Oct. 28, 2004

Related U.S. Application Data

(60) Provisional application No. 60/394,526, filed on Jul. 10, 2002, provisional application No. 60/394,527, filed on Jul. 10, 2002.

(51) Int. Cl.
G06F 7/00 (2006.01)
G06F 17/30 (2006.01)

(52) U.S. Cl. .......................................... 707/2; 707/10

(58) Field of Classification Search .................... 707/2, 707/3, 6, 10
See application file for complete search history.

(56) References Cited

U.S. PATENT DOCUMENTS 5,970,482 A * 10/1999 Pham et al. .................. 706/16

6,675,164 B2 * 1/2004 Kamath et al. ................ 707/6
6,687,693 B2    2/2004 Cereghini et al.
6,708,163 B1 * 3/2004 Kargupta et al. .............. 707/3

OTHER PUBLICATIONS

"Distributed Mining of Classification Rules", By Cho and Wuthrich, 2002 http://www.springerlink.com/(21nnasudlakyzciv54i5kxz0)/app/home/contribution.asp?referrer=parent &backto=issue,1,6;journal,2,3,31;linkingpublicationresults,1: 105441,1.*

* cited by examiner

Primary Examiner—Apu Mofiz
Assistant Examiner—Chelcie L. Daye
(74) Attorney, Agent, or Firm—Seyfarth Shaw LLP

(57) ABSTRACT

A distributed data mining method and system includes a mediator and a plurality of agents, each of said plurality of agents having a local database. The mediator invokes the agents and each agent performs an attribute/value selection process. The agents pass their respective best attribute/value pair to the mediator and the mediator determines a winning agent from the submissions. The agents are notified of the winning selection and the winner then begins data splitting based on the willing attribute/value pair. The winning agent forwards a split information index to the mediator. The mediator provides the split information index to other, non-winning agents and the agents generate rules for the data mining.

3 Claims, 2 Drawing Sheets

DISTRIBUTED DATA MINING AND COMPRESSION METHOD AND SYSTEM

CROSS-REFERENCE TO RELATED APPLICATION

The present application claims the benefit of U.S. Provisional Patent Applications Ser. No. 60/394,526 filed Jul. 10, 2002, and Ser. No. 60/394,527 filed Jul. 10, 2002, both of which are incorporated herein by reference.

BACKGROUND OF THE INVENTION

1. Field of the Invention

The present invention relates generally to a data mining method and system and, more specifically, to a distributed agent-based data mining method and system for use in distributed data environments.

2. Description of the Related Art

As the 21st Century begins, we have seen an explosive growth in capabilities to both generate and collect data. It has been estimated that the amount of data in the world doubles every 20 months and the size and number of databases are increasing even faster. Advances in sensor based data collection as well as the computerization of many area of human activities have flooded decision makers with information and generated an urgent need for new techniques and tools that can intelligently and automatically assist them in transforming this huge amount of data into a useful operational and tactical knowledge.

It is recognized that information is at the heart of business operations and that decision-makers should make the best use of data to gain valuable insight into the business.

Current database management systems give access to the data stored but this is only a small part of what could be gained from the data. Traditional on-line transaction processing systems, On-Line Transaction Processes (OLTPs), are good at putting data into databases quickly, safely and efficiently but are not good at delivering meaningful analysis in return. Analyzing data can provide further knowledge about a business by going beyond the data explicitly stored to derive knowledge about the business. This is where Data Mining or Knowledge Discovery in Databases (KDD) has obvious benefits for any enterprise.

Data Mining, or Knowledge Discovery in Databases (KDD) as it is also known, is the nontrivial extraction of implicit, previously unknown, and potentially useful information from data. This encompasses a number of different technical approaches, such as clustering, data summarization, learning classification rules, finding dependency networks, analyzing changes, and detecting anomalies.

SUMMARY OF THE INVENTION

The present invention provides an agent-based data mining method and system for information exploitation in distributed data environments. The invention distributes computationally expensive and data intensive knowledge mining/discovery processes and at the same time providing for (a) highly coupled algorithmic level integration of these processes and (b) executing these processes without any requests for data transfer among them. A compression tool is provided in a preferred embodiment.

DETAILED DESCRIPTION OF THE PREFERRED EMBODIMENTS

Figure 1:
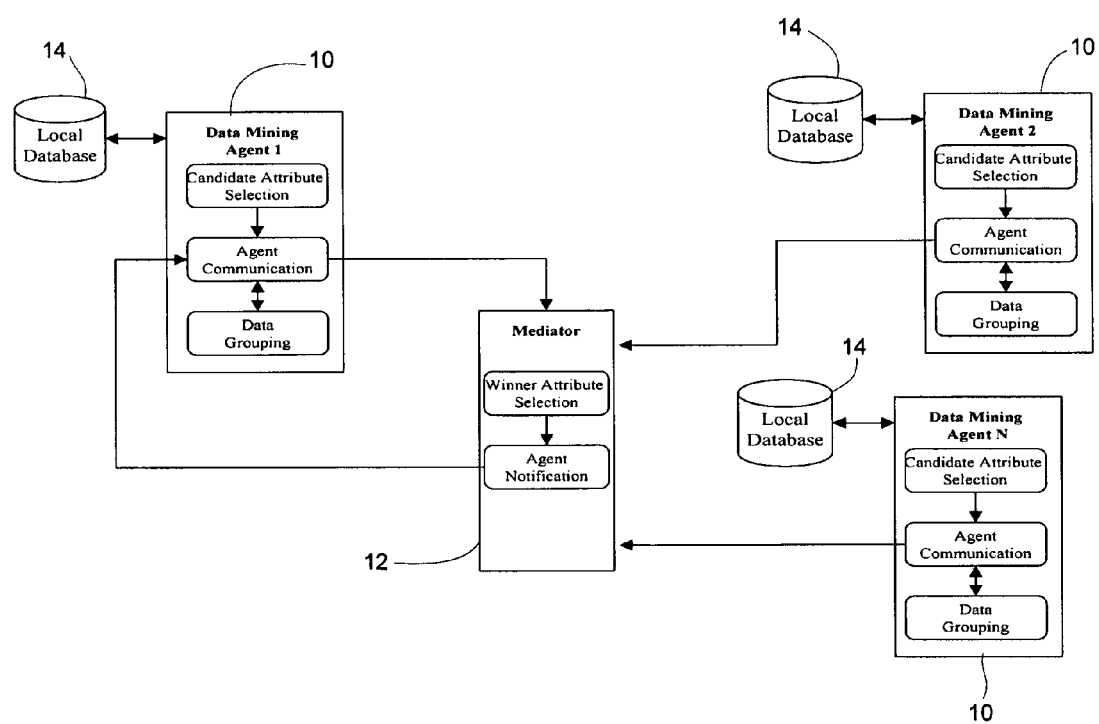
FIG. 1 is a data flow diagram of a distributed data mining method and system according to the principles of the present invention.

FIG. 1 illustrates the basic concept behind the present invention. Distributed mining is accomplished via a synchronized collaboration of agents 10 as well as a mediator component 12. The mediator component 12 facilitates the communication among the agents 10. As it can be seen in FIG. 1, each agent 10 has access to its own local database 14 and is responsible for mining the data contained by the database.

Figure 2:
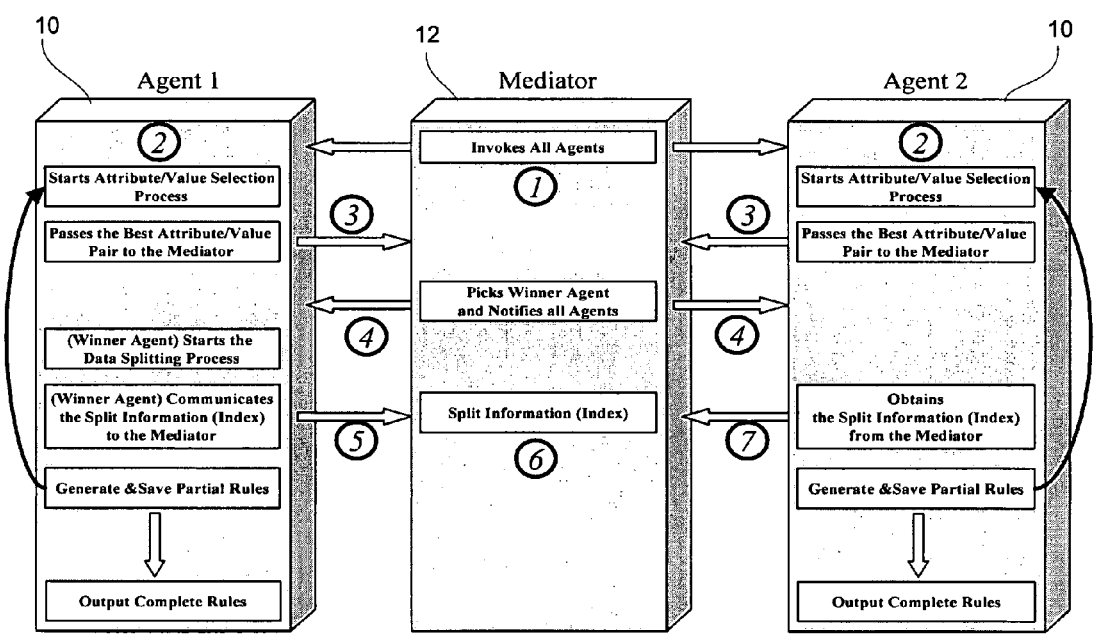
FIG. 2 is a process block diagram illustrating the method of the present invention.

Distributed data mining results in a set of rules generated through a tree induction algorithm. The tree induction algorithm, in an iterative fashion, determines the feature which is most discriminatory and then it dichotomizes (splits) the data into classes categorized by this feature. The next significant feature of each of the subsets is then used to further partition them and the process is repeated recursively until each of the subsets contain only one kind of labeled data. The resulting structure is called a decision tree, where nodes stand for feature discrimination tests, while their exit branches stand for those subclasses of labeled examples satisfying the test. A tree is rewritten to a collection of rules, one for each leaf in the tree. Every path from the root of a tree to a leaf gives one initial rule. The left-hand side of the rule contains all the conditions established by the path, and the right-hand side specifies the classes at the leaf. Each such rule is simplified by removing conditions that do not seem helpful for discriminating the nominated class from other classes In the distributed framework, tree induction is accomplished through a partial tree generation process and an agent-mediator communication mechanism (FIG. 2) that executes the following steps:

1. The data mining process starts with the mediator 12 issuing a call to all the agents 10 to start the mining process.

2. Each agent 10 then starts the process of mining its own local data by finding the feature (or attribute) that can best split the data into the various training classes (i.e. the attribute with the highest information gain).

3. The selected attribute is then sent as a candidate attribute to the mediator 12 for overall evaluation.

4. Once the mediator 12 has collected the candidate attributes of all the agents 10, it can then select the attribute with the highest information gain as the winner.

5. The winner agent 10 (i.e. the agent whose database 14 includes the attribute with the highest information gain) will then continue the mining process by splitting the data using the winning attribute and its associated split value. This split results in the formation of two separate clusters of data (i.e. those satisfying the split criteria and those not satisfying it).

6. The associated indices of the data in each cluster are passed to the mediator 12 to be used by all the other agents 10.

7. The other (i.e. non-winner) agents 10 access the index information passed to the mediator 12 by the winner agent 10 and split their data accordingly. The mining process then continues by repeating the process of candidate feature selection by each of the agents 10.

8. Meanwhile, the mediator 12 is generating the classification rules by tracking the attribute/split information coming from the various mining agents 10. The generated rules can then be passed on to the various agents 10 for the purpose of presenting them to the user through advanced 3D visualization techniques.

According to a further aspect of the invention, a compression method is provided. The method and system according to this aspect of the invention includes a number of data mining agents 10 whose efforts are coordinated through a facilitator. One of the major functions of the facilitator is to collect information from various agents 10 and to broadcast the collected information to other agents 10 involved in the mining process. To this end, there is a certain amount of cost (in terms of resources) associated with the distributed mining process, namely that of the communication bandwidth. For very large datasets, the high cost of transferring information from one agent to another can become a major bottleneck. To alleviate this problem the present invention provides that a compression method is applied in order to reduce the transmission costs.

As explained in previously, each agent 10 in is responsible for mining its own local data by finding the feature (or attribute) that can best split the data records into the various training classes (i.e. the attribute with the highest information gain). The selected attribute is then sent as a candidate attribute to the mediator 12 for overall evaluation. Once the mediator 12 has collected the candidate attributes of all the agents, it can then select the attribute with the highest information gain as the winner. The winner agent 10 (i.e. the agent whose database includes the attribute with the highest information gain) will then continue the mining process by splitting the data records using the winning attribute and its associated split value. This split results in the formation of two separate clusters of data records (i.e. those satisfying the split criteria and those not satisfying it). The associated indices of the data records in each cluster are passed to the mediator 12 to be used by all the other agents 10. The other (i.e. non-winning) agents 10 access the index information passed to the mediator 12 by the winning agent 10 and split their data records accordingly. The mining process then continues by repeating the process of candidate feature selection by each of the agents 10.

Thus, in the present process, the bulk of the information which needs to be passed from one agent 10 to another during the collaborative mining process is comprised of a list of data record indexes. Passing the index information using an integral representation can become a major problem for a large number of data records. To this end, present method utilizes a compression mechanism, which includes the following two processes:

Process 1. Index Bit-Vector Generation: During the index bit-vector generation phase, the index information, normally represented as a set of integers (i.e. record numbers), is converted to a bit-vector representation. In a bit-vector representation, each individual bit corresponds to the index of a single data record. Thus bit number three, for example, corresponds to the index of the third data record. The actual value of the bit represents the presence or absence of the corresponding data record in the data cluster being passed from one agent to another. A value of "1" represents the presence of that data record, while a value of "0" represents its absence. This representation is much more compact than the set-of-integers representation. The difference in size for large number of data records is dramatic.

Process 2. Index Bit-Vector Compression: Once the index information is converted into a bit-vector representation, a compression algorithm is used to further reduce the size of the data being transferred. Another major advantage of using the index bit-vector representation, over that of using integral values, besides its compactness, is that since the data splitting process is an iterative one, in any given iteration (except the first one), we don't really need to know the actual (i.e. original) index positions of the data records being split. Instead, all that is required is the information about the presence or absence of any data record in any subsequent split. This makes the size of the index information being passed from one agent to another at each iteration significantly smaller than that of the previous one.

Advantages of the present method and system become apparent by comparison to a multi-agent system. While the present method exhibits some resemblance to a mobile Multi Agent System (MAS—a loosely coupled network of software agents that interact to solve problems that are beyond the individual capacities or knowledge of each problem solver), it differentiates from a MAS in very many aspects. Its major differentiators are explained in

TABLE 1

| | MAS Based Solutions | Present Distributed Knowledge Management (DKM) Solutions |
|---|---|---|
| Computational Mechanism | An MAS mainly retrieves, filters, and globally coordinates information from sources that are spatially distributed. | The present method goes beyond retrieval and filtering by applying computationally intensive data mining processes that can discover "deep" knowledge (e.g., rules) across distributed data locations. Discovered knowledge represents inductive generalization of distributed data. Uniqueness: Distributing computationally expensive and data intensive knowledge mining/discovery processes and at the same time providing for highly coupled algorithmic level integration of these processes without any requests for data transfers. |

TABLE 1-continued

|  | MAS Based Solutions | Present Distributed Knowledge Management (DKM) Solutions |
|---|---|---|
| Agent Information Exchange Level | A typical MAS architecture provides for a data component level information extraction via collaborative filtering, search, etc. An example of such a data level approach is NIMA's project on "Intelligent Database Agents for Geospatial Knowledge Integration and Management is concerned the collection and integration of data by mobile agents via four distinct classes of agents-updating, integration, conflation, and managing agents. | The present method generalizes from data. Its information integration process is conducted on the higher level of data models, rather than on the data component level. In fact, to data components are exchanged among mining agents. Uniqueness: Support for data security at the algorithimic level (no data transfers among agents). |
| Knowledge Representation | A MAS represents knowledge in the form of filtered data components and usually provides for some level of semantic integration. To simplify the information retrieval process some MAS system use domain ontologies. | A rule generation mechanism in the present method is geared towards generation of predictive models that can be used immediately to support decision-making. Prior to the mining process the present method performs syntatic analysis of distributed databases and generates meta-data bridges. Uniqueness: Generation of highly predictive models from data. |
| Information Retrieval vs Exploitation | The semantic representations of the context of the information analysis problem in a MAS system are mainly used to support intelligent information retrieval. | In contrast to the MAS representations, the present method's representations (inductive generalizations) truly support information exploitation. Uniqueness: Information exploitation via inductive generalizations from distributed data. |
| Collaborative Decision Making | Typically two groups of support for decision making: (a) Exchange of information before the decision making process begins (basing one's decision on the data provided by others) (b) Exchange of information after the decision making process ends (adjusting one's decision based on that of others) | Exchange of information during the decision making process Uniqueness: helping the "team" of collaborative agents make a wiser decision by sharing knowledge and expertise while the decision is being made. |

Although other modifications and changes may be suggested by those skilled in the art, it is the intention of the inventors to embody within the patent warranted hereon all changes and modifications as reasonably and properly come within the scope of their contribution to the art.

We claim:

1. A method for distributed data mining, comprising the steps of:

invoking a plurality of agents by a mediator;

beginning attribute selection by each agent, wherein attribute, selection being the selection of one data attribute from a set of local data attributes unique to the respective agent such that the selected data attribute has the highest information gain value among all local attributes;

collecting the highest information gain values from the plurality of agents by the mediator, wherein the highest information gain value of a respective agent is based on its own local data with its own unique data attributes;

selecting by the mediator of a winning agent, wherein the winning agent is the only agent from the plurality of agents with access to the local data attribute with the highest global information gain value;

initiating data splitting by said winning agent based on the value of the data attribute with the highest information gain wherein the specified data attribute is unique to the respective agent's local data;

forwarding split data index information resulting from said data splitting by said winning agent to said mediator;

forwarding said split data index information from said mediator to each of said plurality of agents;

initiating data splitting by each of said plurality of agents other than said winning agent based on the split data index information furnished by the winning agent and broadcasted by the mediator;

generating and saving partial rules by repeating the attribute selection and data splitting process recursively and by tracking the attribute/split information coming from that iteration's winning agent; and outputting complete rules obtained at the completion of the mining process to said plurality of agents.

2. A The method as claimed in claim 1, wherein said plurality of agents include non-winning agents, and further comprising the step of:

obtaining split data index information by said non-winning agents from said mediator.

3. A The method as claimed in claim 1, wherein said split data index information is compressed.

* * * * *